July 4, 1961 — H. H. GEORGE — 2,991,470
ROLL STABILIZATION SYSTEM
Filed Feb. 3, 1953 — 3 Sheets-Sheet 1

INVENTOR.
HENRY H. GEORGE

July 4, 1961　　　　H. H. GEORGE　　　　2,991,470
ROLL STABILIZATION SYSTEM
Filed Feb. 3, 1953　　　　　　　　　　　　3 Sheets-Sheet 2
CLOCKWISE ROLL ERROR
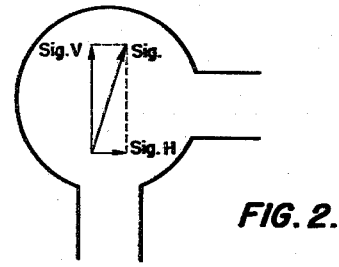
COUNTER CLOCKWISE ROLL ERROR
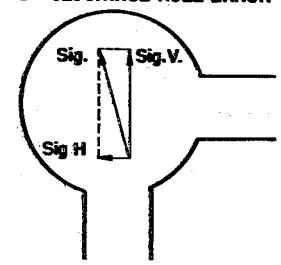
FIG. 2.
DISK NEUTRAL　DISK UP　DISK NEUTRAL　DISK DOWN　DISK NEUTRAL
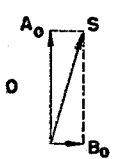 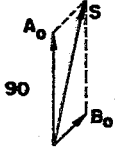 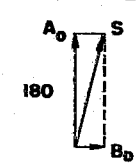 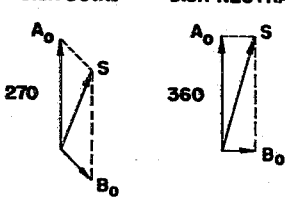 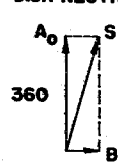
　　0　　　　90　　　　180　　　　270　　　　360　　　　(a)
FIG. 3.
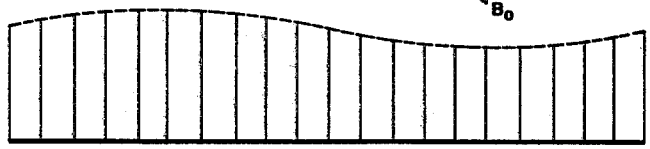
(b)
RESULTING MODULATION OF THE SUM SIGNAL FOR A CLOCWISE ROLL ERROR
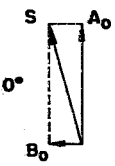 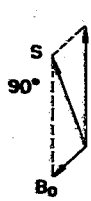 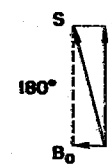 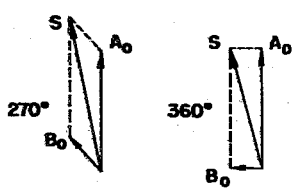
　0°　　　　90°　　　　180°　　　　270°　　　　360°　　　　(c)
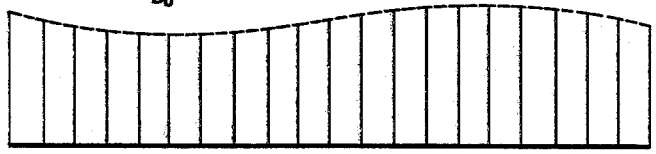
(d)
RESULTING MODULATION OF THE SUM SIGNAL FOR A COUNTER CLOCKWISE ROLL ERROR
INVENTOR.
HENRY H. GEORGE
BY
ATTORNEYS

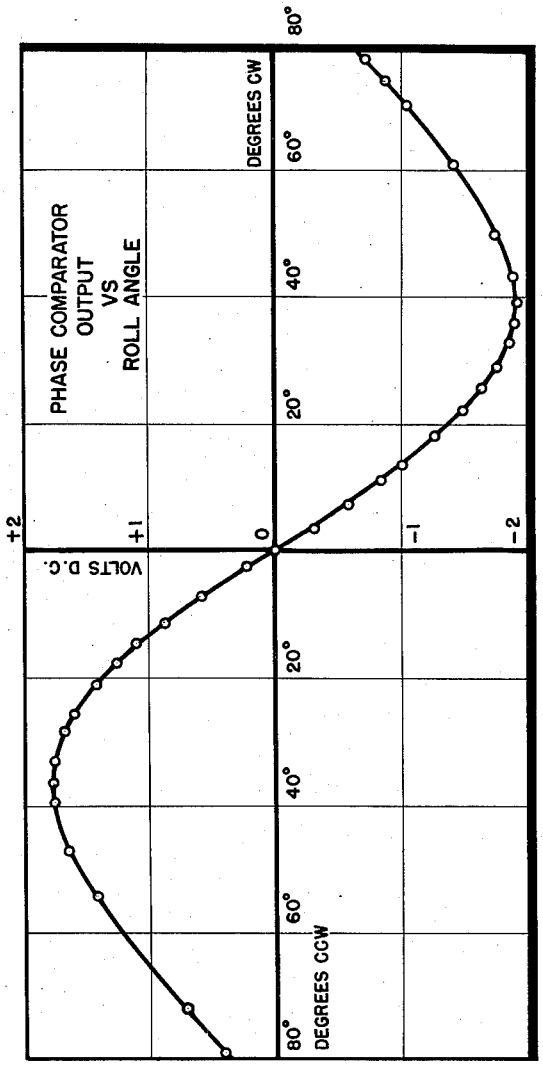

United States Patent Office 2,991,470
Patented July 4, 1961

2,991,470
ROLL STABILIZATION SYSTEM
Henry H. George, Silver Spring, Md., assignor to the United States of America as represented by the Secretary of the Navy
Filed Feb. 3, 1953, Ser. No. 334,953
8 Claims. (Cl. 343—100)

This invention pertains generally to roll stabilization systems for aerial missiles, and more particularly to a roll polarimeter for an aerial missile which utilizes phase modulation of the cross polarization component of a received vertical polarized microwave signal.

One of the objects of this invention is to provide a roll stabilization system for an aerial missile which will utilize a phase shifter modulator therein.

Another object of this invention is to provide a roll polarimeter for the intelligence portion of the roll stabilization system of an aerial missile.

To provide an improved roll stabilization system for an aerial missile which is simple and reliable in operation, compact, and economical to construct, are objects of this invention.

Other objects and many of the attendant advantages of this invention will be readily appreciated as the same becomes better understood by reference to the following detailed description when considered in connection with the accompanying drawings, and in which:

FIG. 2 illustrates vector diagrams for the clockwise roll and for the counter-clockwise roll error signals;

Figure 1:
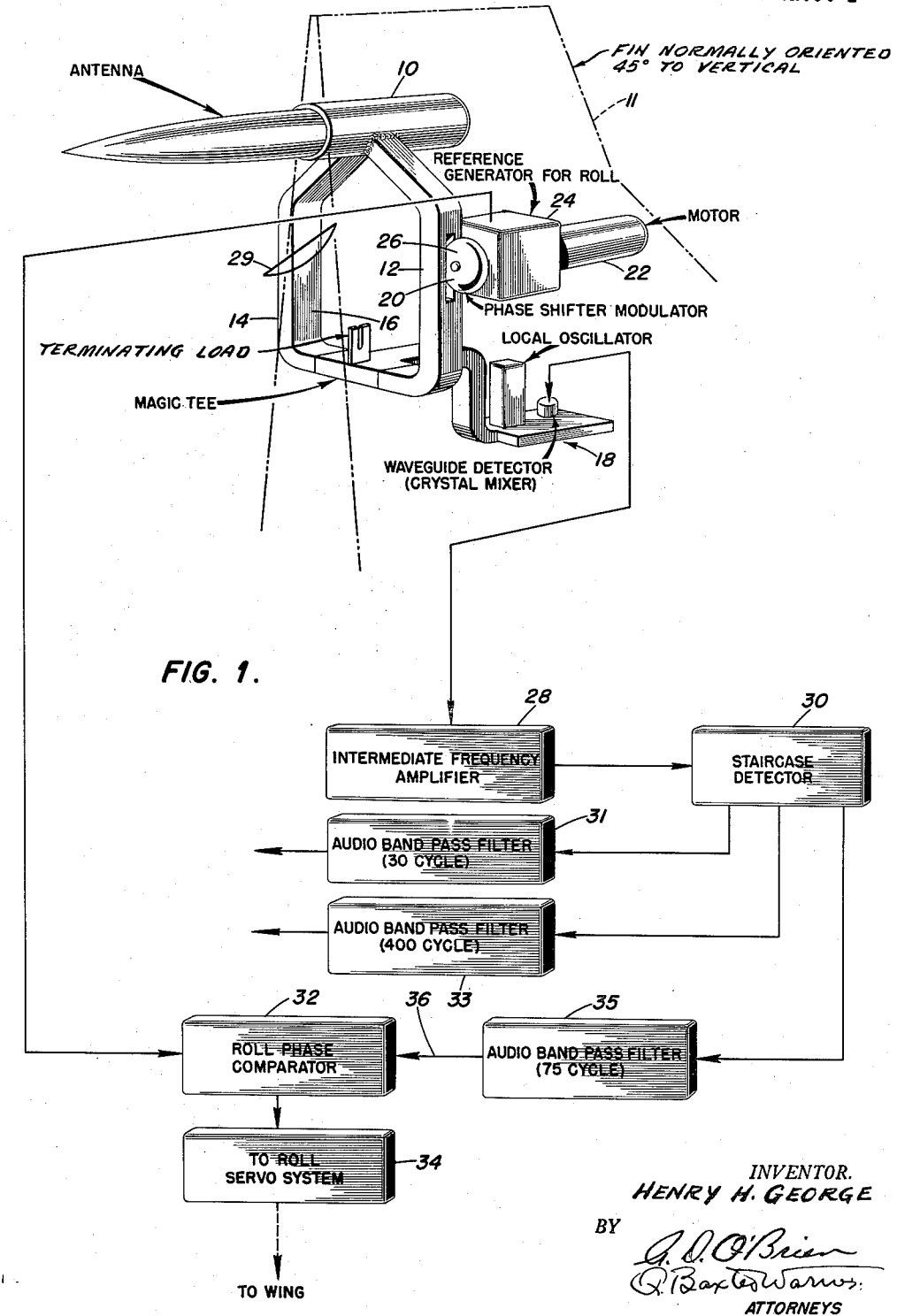
FIG. 1 is a block diagram of the roll intelligence system, embodying therein a roll polarimeter.

FIG. 3 also illustrates vector diagrams for the resulting modulation of the sum signals for clockwise and counter-clockwise roll signal errors; and FIG. 4 is a graph showing the phase comparator output as a function of roll angle for the polarimeter using a mechanical phase shifter.

In accordance with the invention, a roll stabilization system is provided for an aerial missile. This system makes use of a roll polarimeter for the intelligence portion of the system which utilizes phase modulation of the cross polarization component of a received vertical polarized microwave signal. The polarimeter includes an antenna means which terminates in two rectangular waveguides, such that the arms of the two waveguides are positioned to receive the vertical and horizontal components of the antenna signal, respectively, together with means for summing together the signal outputs from the two arms of the waveguides, means for detecting the sum signals, and means in the arm of one of the waveguides including a disk to phase modulate the signal therein, and means in the arm of the other waveguide to shift the phase of the signal therein so that the signals in the arms of the two waveguides are 90° apart from the neutral position of the disk. Additional means are provided for amplifying, detecting and filtering the signal from the detecting means. This signal is then fed to a roll servo system, which, in turn, controls the positions of the wings of the aerial missile.

Referring now to FIG. 1 of the drawings, there is shown a non-polarizing antenna 10 which is mounted on one of the fins 11 of an aerial missile, which fin is normally located 45° to the vertical, and which terminates in two rectangular waveguides 12 and 14. The arm of waveguide 14 is positioned to receive the vertical component of the antenna signal, while the arm of waveguide 12 is positioned to receive the horizontal component of the antenna signal.

The outputs of the two arms are summed together in a magic T 16, and the signal therefrom is fed to a waveguide detector 18 (crystal mixer). It is to be emphasized at this point that the signal may be superheterodyned or "videoed" as required.

The signal in the arm of waveguide 12 is phase modulated by the rotation of the eccentrically mounted dielectric disk 20 in phase shifter modulator 26 which is driven by a motor 22. The motor 22 also drives a reference alternating current generator 24 whose sinusoidal output is equal in frequency to the revolutions per second of the disk 20 as well as being mechanically phase locked to it.

A phase shifter 29 (or line stretcher) in the arm of waveguide 14 is adjusted so that the signals in the arms of waveguides 12 and 14 are 90° apart for the neutral position of the disk 20. For maximum insertion of the disk 20 in the arm of the waveguide 12, the signal from this arm is delayed an additional 45°. Hence, the signals are 135° apart. For minimum insertion of the disk 20 in the arm of waveguide 12, the signal from the arm of waveguide 12 is effectively advanced 45° from the neutral position so that the signals for this condition are approximately 45° apart. It is to be noted that the horizontal component for a clockwise roll position error is 180° from a counter-clockwise roll position as illustrated in FIG. 2.

The vector diagrams of the outputs from the arms of waveguides 12 and 14, with the resulting summation vectors as seen by the detector 18 for four positions of the eccentric disk phase shifter 20 are shown in FIG. 3(a) for a clockwise roll error and FIG. 3(c) for a counter-clockwise roll error. The resulting complete cycle of modulation of the received signal is shown in FIGS. 3(b) and 3(d), directly below the respective vector diagrams. There would be no horizontal vector for a zero roll angle, that is, all the radio frequency signal would enter the arm of waveguide 14. Hence, there would be a zero radio frequency signal in the arm of waveguide 12 to be phase modulated so that the zero roll means zero modulation. The latter is not shown in the vector diagrams of FIG. 3.

Referring again to FIG. 1 of the drawings, the output of the detector arrangement 18 is amplified by a conventional intermediate frequency amplifier 28 and the amplitude modulation signal is detected by a conventional staircase detector 30. The output of the detector 30 may be a complex wave form made up of several audio frequency signals. These audio frequency signals are separated by the audio frequency band pass filters 31, 33, and 35 connected to the output of the detector 30. The roll angle of information is separated from the other audio signals by audio band pass filter 35. The purpose of filter 35 is to eliminate modulation frequencies other than the 75 cycle modulation frequency of the phase shift modulator 26. The filtered signal from filter 35 is then fed to the roll phase comparator 32.

This 75 cycle signal and the sinusoidal signal output of the reference generator 24 are phase sensitive rectified by the roll phase comparator 32 to produce a D.-C. output voltage, which is fed to the roll servo system 34 as indicated. In FIG. 4 there is illustrated of a plot of the D.-C. voltage output of the roll phase comparator 32 vs. roll angle of the missile for an experimental model.

A phasing network (R-C network) (not shown) is required in the sinusoidal voltage leads 36 to the phase comparator 32 to phase the voltage for maximum efficiency of the phase comparator 32 shown in FIG. 1. It is to be noted that zero voltage occurs at 90° and at 270°, as shown in FIG. 4. The slope of the curve of D.-C. volts vs. degrees of roll angle is opposite to the slope through 0° roll angle. An ambiguity arises at 180° which necessitates a method of sensing by use of a supplemental or additional "poor" roll device in the servo system. This can be achieved by utilizing a small and inexpensive gyroscope. It is believed that the arrangement described so far provides accurate information in the range of ±45° on either side of zero roll position. This polarimeter system requires no additional tubes when used with a receiver (not shown) that already has an intermediate frequency amplifier and a staircase detector.

The signal from the roll phase comparator 32, as indicated above, is fed to a roll servo system, which, in turn, controls a mechanical linkage. The mechanical linkage is attached to the wings of the aerial missile and is used to position the wings in order to roll stabilize the missile.

In addition, two or more channels of intelligence may be abstracted from the amplitude modulation of the pulses by the filters 31 and 33. One of these in the system constructed is a 400 cycle signal used in the automatic frequency control of the local oscillator, which is part of the waveguide detector 18, and the other channel was a 30 cycle error frequency signal utilized in the missile guidance control system.

Obviously many modifications and variations of the present invention are possible in the light of the above teachings. It is therefore to be understood that within the scope of the appended claims the invention may be practiced otherwise than as specifically described.

What is claimed is:

1. In a roll stabilization system for an aerial missile, a roll polarimeter for the intelligence portion of said system which utilizes phase modulation of the cross polarization component of a received vertical polarized microwave signal, comprising, an antenna means which terminates in two rectangular waveguides, the arms of the first and second waveguides being positioned to receive the vertical and horizontal components, respectively, of the antenna signal, means for summing together the signal outputs from said first and second arms of said waveguides, means for detecting said summed signal, means in the arm of said second waveguide including a disk to phase modulate the signal therein, means in the arm of said first waveguide to shift the signal therein so that the signals in the arms of said first and second waveguides are 90° apart from the neutral position of said disk, and additional means for amplifying, detecting and filtering the signal from said detecting means.

2. In a roll stabilization system for an aerial missile, a roll polarimeter for the intelligence portion of said system which utilizes phase modulation of the cross polarization component of a received vertical polarized microwave signal, comprising, an antenna means which terminates in two rectangular waveguides, the arms of the first and second waveguides being positioned to receive the vertical and horizontal components, respectively, of the antenna signal, means for summing together the signal outputs from said first and second arms of said waveguides, means for detecting said summed signal, means in the arm of said second waveguide including a disk to phase modulate the signal therein, a reference alternating current generator whose sinusoidal output is equal in frequency to the revolutions per second of said disk as well as being mechanically locked to it, means in the arm of said first wavegiude to shift the signal therein so that the signals in the arms of said first and second waveguides are 90° apart from the neutral position of said disk, additional means for amplifying, detecting and filtering the signal from said detecting means, and means for phase sensitive rectifying the sinusoidal signal from said detector and the sinusoidal signal from said reference generator to produce a direct current voltage which is fed to the roll system.

3. In a roll stabilization system for an aerial missile, a roll polarimeter for the intelligence portion of said system which utilizes phase modulation of the cross polarization component of a received vertical polarized microwave signal, comprising, a non-polarizing antenna which terminates in two rectangular waveguides, the arms of the first and second waveguides being positioned to receive the vertical and horizontal components, respectively, of the antenna signal, means for summing together the signal outputs from said first and second arms of said waveguides, means for detecting said summed signal, means in the arm of said second waveguide including a disk to phase modulate the signal therein, a reference alternating current generator whose sinusoidal output is equal in frequency to the revolutions per second of said disk as well as being mechanically locked to it, means in the arm of said first waveguide to shift the signal therein so that the signals in the arms of said first and second waveguides are substantially 90° apart from the neutral position of said disk, additional means for amplifying, detecting and filtering the signal from said detecting means, and means for phase sensitive rectifying the sinusoidal signal from said detector and the sinusoidal signal from said reference generator to produce a direct current voltage which is fed to the roll system of said aerial missile.

4. An arrangement as set forth in claim 3, wherein said means for summing together the signal outputs from the arms of said waveguides comprises a magic T.

5. An arrangement as set forth in claim 4, wherein the means in the arm of said second waveguide comprises an eccentrically mounted dielectric disk in a phase shifter modulator.

6. An arrangement as set forth in claim 5, wherein the detecting means comprises a waveguide detector of the crystal mixer type.

7. An arrangement as set forth in claim 6, wherein the shifting means in the arm of said first waveguide for said signal therein comprises a phase shifter.

8. An arrangement as set forth in claim 7, wherein the means for phase sensitive rectifying said output signals from said amplifying, detecting and filtering means and from said reference generator comprises a roll phase comparator.

References Cited in the file of this patent

UNITED STATES PATENTS

| | | |
|---|---|---|
| 2,272,839 | Hammond | Feb. 10, 1942 |
| 2,362,832 | Land | Nov. 14, 1944 |
| 2,616,640 | Bedford | Nov. 4, 1952 |
| 2,619,635 | Chait | Nov. 25, 1952 |